United States Patent

Kitzner

[15] 3,672,537

[45] June 27, 1972

[54] FUEL TANK VAPOR SEPARATOR SYSTEM HAVING PIVOTING ARM VAPOR PICKUP

[72] Inventor: Ernest W. Kitzner, Allen Park, Mich.
[73] Assignee: Ford Motor Company, Dearborn, Mich.
[22] Filed: Aug. 14, 1970
[21] Appl. No.: 63,873

[52] U.S. Cl..........................................220/85 VR, 123/136
[51] Int. Cl..........................................................B65d 25/00
[58] Field of Search............220/85, 88, 85 VR, 85 VS, 85 A, 220/85 B; 261/160; 123/136; 244/135 R; 137/43

[56] References Cited

UNITED STATES PATENTS 1,514,107  11/1924  Schutten..............................244/135.5
290,558  12/1883  Finn.........................................220/85
1,871,055  8/1932  Hasbrouck........................244/135 R

FOREIGN PATENTS OR APPLICATIONS 505,824  9/1954  Canada..............................244/135 R Primary Examiner—Raphael H. Schwartz
Attorney—John R. Faulkner and Glenn S. Arendsen

[57] ABSTRACT

A hollow arm pivots in a plane substantially parallel to the fuel tank roof about a pivot member located in the center of the roof. Buoyant material attached to the outer end of the arm urges that end to any vapor space existing above the liquid regardless of tank attitude. Excess fuel vapors pass through the passage in the arm and are conducted to the engine combustion chambers.

5 Claims, 2 Drawing Figures

PATENTED JUN 27 1972 3,672,537

INVENTOR
ERNEST W. KITZNER

BY John R. Faulkner
Glenn D. Arendsen
ATTORNEYS

FUEL TANK VAPOR SEPARATOR SYSTEM HAVING PIVOTING ARM VAPOR PICKUP

BACKGROUND OF THE INVENTION

This invention relates to and is assigned to the assignee of U.S. Pats. Latvala et al. No. 3,542,239; Roven No. 3,548,847; and Kitzner No. 3,586,015.

In response to legislation establishing limits on the amount of fuel vapor that can be emitted from vehicle fuel tanks, several alternate systems have been proposed for separating the fuel vapor from the liquid fuel for all anticipated fuel tank attitudes and burning the fuel vapor in the combustion chambers of the vehicle engine. Virtually all of these systems use an absorbent material such as carbon to store excess vapors produced when the vehicle engine is not operating. Since relatively small amounts of liquid contaminate those absorbents, each system must do a highly effective job of separating the fuel vapor from the fuel liquid.

SUMMARY OF THE INVENTION

The vapor separating system provided by this invention removes excess fuel vapors from a liquid fuel tank movable into varying attitudes while preventing removal of significant amounts of liquid fuel regardless of all anticipated tank attitudes. Moreover, the system is relatively easy to manufacture, install and maintain. In the system, a support member is located in the approximate center of the tank roof inside the fuel tank. An arm member that extends in a plane substantially parallel to the tank roof is pivotally mounted on the support member within the tank so that the arm can pivot about the support member. The arm member has a passage therein that opens into the fuel tank near the outer end of the arm member. A small amount of buoyant material is attached to the arm near its outer end. The passage in the arm communicates through a plurality of small openings in the support member with a conduit leading outside of the tank to vapor storage and consuming devices.

Maximum liquid fuel level within the tank is limited to a plane located just below the lower edge of the outer opening of the arm member when the tank is in a normal, horizontal attitude. Any liquid fuel contacting the buoyant material exerts forces thereon that pivot the arm member about the support member to a position where the outer end of the arm communicates with any fuel vapors existing in the tank. Excess fuel vapors pass through the passage in the arm member and the conduit to the vapor consuming devices.

BRIEF DESCRIPTION OF THE DRAWINGS

FIG. 2 also illustrates an alternate construction in which the function of the buoyant material is performed by a weight attached to the arm member opposite the pivot from the arm itself.

DETAILED DESCRIPTION

Figure 1:
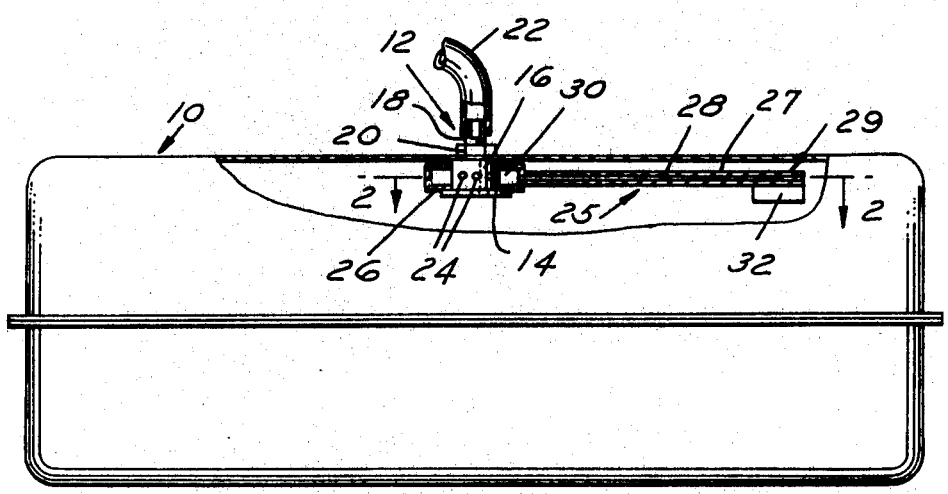
FIG. 1 is a partially sectioned elevation of a vehicle fuel tank showing the support member and the pivoting arm.

Referring to FIG. 1, a vehicle fuel tank 10 has a support member 12 fastened to the lower side of the approximate center of the tank roof. Support member 12 has an enlarged lower flange 14 connected to a cylindrical section 16. The top of section 16 bears against the lower side of the tank roof and a short tube 18 connected to section 16 projects through a hole in the roof. Tube 18 carries external screw threads and a threaded nut 20 threadably engages those screw threads to fasten the support member to the tank roof. A conduit 22 connects the end of tube 18 with vapor storage and consuming devices (not shown). Cylindrical portion 16 contains a plurality of small holes 24 that communicate with an internal passage in tube 18.

An arm member 25 is mounted pivotally on cylindrical portion 16 so that the arm member can pivot in a plane substantially parallel to but slightly below the tank roof. Arm member 25 includes an enlarged cylindrical portion 26 mounted pivotally on cylindrical portion 16 of the support member. A hollow tube 27 is fastened to portion 26 and projects radially outward therefrom. Tube 27 contains a passage 28 that opens into the fuel tank at the outer end 29 of the tube. At the inner end of the tube, passage 28 communicates with an annular space 30 formed within portion 26 and extending at least partially around cylindrical portion 16 so the space communicates with holes 24 for all pivotal positions of arm 26. A small amount of a material 32 that is buoyant in liquid fuel is attached to the lower surface of the outer end 29 of tube 27.

The maximum fuel level in tank 10 is limited to a plane located just below the lower edge of the outer opening of passage 28 by any conventional fill limiting device. A typical fill limiting device is disclosed in U.S. Pat. application, Ser. No. 784,764 filed Dec. 18, 1968 and the disclosure thereof is hereby incorporated into this specification. Briefly, the fill limiting device comprises extending the fuel tank filler tube into the tank so the opening of the filler tube is a short distance below the roof of the tank and extending a vent tube into the approximate center of the tank so the opening of the vent tube also is a short distance below the tank roof. When the liquid fuel level in the tank during filling reaches the openings of the filler tube and the vent tube, the tank refuses to accept further fuel. A vapor space corresponding to the smaller amount of projection of the vent tube or filler tube below the tank roof thus is maintained in the tank.

When the fuel tank is in its normal horizontal position, passage 28 communicates with the vapor space regardless of the pivotal position of tube 27. When tank attitude is displaced from horizontal by vehicle movement, buoyant forces exerted on buoyant material 32 by any liquid fuel pivot arm member 25 about support member 12 so that tube 27 soon moves to a position where the open end of passage 28 again communicates with the vapor space. Arm member 25 does not have to move instantaneously because it is highly unlikely that excess fuel vapor will be generated while the vehicle engine is drawing liquid fuel from the tank. Excess vapors usually begin forming only after the engine has been turned off and the vehicle has been at rest for several minutes. Excess vapors might be generated when the engine is operating at low speeds for an extended time period such as in heavy urban traffic; vehicle attitude changes then occur slowly and the arm member has no difficulty in maintaining adequate communication with the vapor space.

Figure 2:
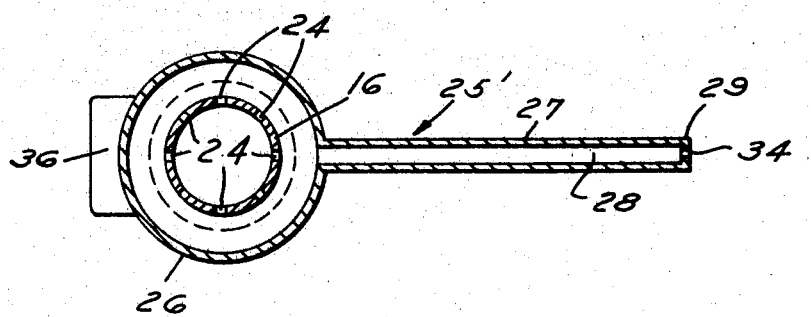
FIG. 2 is a cross-sectional view taken along line 2—2 of FIG. 1 to show a small orifice in the peripheral end of the arm that prevents significant amounts of sloshing liquid fuel from entering the passage within the arm.

Referring also to FIG. 2, the outer end of tube 27 can contain a small orifice 34 that connects passage 28 with the tank interior. Orifice 34 assists considerably in preventing significant amounts of sloshing fuel from entering passage 28. Orifice size typically is about 0.050 inch.

FIG. 2 also illustrates an alternate construction in which buoyant material 32 is eliminated and a small weight 36 is attached to cylindrical portion 26 on the opposite side of tube 27. The vertical moment of weight 36 about the pivotal axis of the arm member exceeds that of the tube portion of the arm even when weight 36 is submerged in liquid fuel and arm 26 is wholly or partially out of the liquid fuel. Weight 36 thus produces an unbalanced condition that urges tube end 29 toward the upper sector of its pivot plane regardless of fuel tank attitude.

The system of the invention is most useful in fuel tanks having a round or relatively square roof, but satisfactory results an be obtained in tanks having other shapes by reducing appropriately the maximum liquid level. End portion 29 of tube 27 can be made of flexible material. Some of the buoyant material then can be attached to the flexible material so the opening of passage 28 is closer to the tank roof. A check valve can be included in conduit 22 to prevent vapor flow at tank pressures below some predetermined minimum.

Thus the system of the invention effectively removes excess fuel vapors from the vehicle fuel tank. The main elements of the system are installed within the fuel tank to eliminate interference with other vehicle components and to eliminate the possibility of externally caused damage.

I claim:

1. A system for removing excess fuel vapors from a liquid fuel tank movable into varying attitudes while preventing removal of significant amounts of liquid fuel regardless of tank attitude comprising
a support member located in the approximate center of the tank roof, and
an arm member pivotable about said support member in a plane substantially parallel to but slightly below the tank roof, said arm member including a passage means opening into the fuel tank near the outer end of the arm member, said arm member including means for pivoting the arm member about said support member to bring the opening of said passage means to the vapor space existing above any liquid fuel in the tank, said passage means conducting excess fuel vapors out of the tank.

2. The system of claim 1 in which said opening of the passage means contains a small restriction means for preventing significant amounts of sloshing liquid fuel from entering the passage means.

3. The system of claim 2 in which the means for pivoting the arm member comprises a buoyant material fastened to said arm member near its outer end, the buoyant force exerted by any liquid fuel on said buoyant member urging said arm member into a position where the opening of the passage means communicates with the vapor space.

4. The system of claim 2 in which the means for pivoting the arm member comprises a weight attached to said arm member radially across said support member from the passage means of the arm member, said weight producing an unbalanced amount that urges the passage means toward an upper position.

5. The system of claim 1 in which the means for pivoting the arm member comprises a buoyant material fastened to said arm member near its outer end, the buoyant force exerted by any liquid fuel on said buoyant member urging said arm member into a position where the opening of the passage means communicates with the vapor space.

* * * * *